(12) United States Patent
Ivanchenko et al.

(10) Patent No.: US 12,007,820 B2
(45) Date of Patent: Jun. 11, 2024

(54) SYSTEMS, DEVICES, AND METHODS FOR CONTROLLER DEVICES HANDLING FAULT EVENTS

(71) Applicant: Infineon Technologies AG, Neubiberg (DE)

(72) Inventors: Konstantin Ivanchenko, Munich (DE); Petru Bacinski, Munich (DE); Bejoy Mathews, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 188 days.

(21) Appl. No.: 17/337,650

(22) Filed: Jun. 3, 2021

(65) Prior Publication Data

US 2021/0382536 A1    Dec. 9, 2021

(30) Foreign Application Priority Data

Jun. 4, 2020  (DE) ..................... 10 2020 114 844.5

(51) Int. Cl.
  *G06F 1/30* (2006.01)
  *G06F 11/07* (2006.01)
  *G06F 11/20* (2006.01)

(52) U.S. Cl.
  CPC ............ *G06F 1/30* (2013.01); *G06F 11/0721* (2013.01); *G06F 11/079* (2013.01); *G06F 11/2015* (2013.01)

(58) Field of Classification Search
  CPC ............... G06F 11/0721; G06F 11/079; G06F 11/2015; G06F 11/2041; G06F 11/2043; G06F 11/2046; G06F 11/3058; G06F 1/30
  See application file for complete search history.

(56) References Cited

U.S. PATENT DOCUMENTS

| | | | |
|---|---|---|---|
| 5,295,258 A | 3/1994 | Jewett | |
| 7,786,770 B1 * | 8/2010 | Liang | ........................ G06F 1/24 327/143 |
| 9,846,706 B1 * | 12/2017 | Basov | ..................... G06F 16/17 |
| 10,914,769 B2 * | 2/2021 | Yamahira | ........... G01R 19/2513 |
| 11,609,795 B2 * | 3/2023 | Hwang | ............... H04L 41/0668 |
| 2011/0025129 A1 * | 2/2011 | Humphrey | ............. H02J 9/061 307/64 |
| 2013/0198539 A1 * | 8/2013 | Furuya | ................ G06F 11/0721 713/502 |

(Continued)

*Primary Examiner* — Matthew M Kim
*Assistant Examiner* — Matthew N Putaraksa
(74) *Attorney, Agent, or Firm* — Eschweiler & Potashnik, LLC

(57) ABSTRACT

A controller chip includes a first cluster including one or more first controller units, a first power supply grid, a first clock tree structure to supply one or more clock signals, and at least a first power supply input. A second cluster includes one or more second controller units, a second power supply grid, a second clock tree structure to supply one or more clock signals, and at least a second power supply input. A monitoring cluster includes a monitoring circuit configured to: monitor the power supply and the clock signal supply of each of the first cluster and second cluster, and in the event of determining at least one of a power supply failure or a clock signal supply failure in one cluster of the first cluster or the second cluster, indicate the failure to the other cluster to take one or more actions.

18 Claims, 2 Drawing Sheets

(56) References Cited

U.S. PATENT DOCUMENTS

| | | | |
|---|---|---|---|
| 2014/0001869 A1* | 1/2014 | Czarnecki | H02J 3/0073 |
| | | | 307/80 |
| 2014/0365756 A1* | 12/2014 | Gabrielson | G06F 9/4408 |
| | | | 713/2 |
| 2015/0067401 A1* | 3/2015 | Ichikawa | G06F 11/079 |
| | | | 714/37 |
| 2016/0321146 A1* | 11/2016 | Makino | G06F 11/3058 |
| 2017/0217443 A1 | 8/2017 | Baumeister | |
| 2017/0262011 A1 | 9/2017 | Kwon | |
| 2018/0059754 A1* | 3/2018 | Shaikh | H02J 1/12 |
| 2019/0230793 A1* | 7/2019 | Lassini | H05K 1/14 |
| 2020/0366284 A1* | 11/2020 | Ito | G06F 1/30 |
| 2020/0387426 A1* | 12/2020 | Jain | G06F 11/076 |

* cited by examiner

SYSTEMS, DEVICES, AND METHODS FOR CONTROLLER DEVICES HANDLING FAULT EVENTS

REFERENCE TO RELATED APPLICATION

This application claims priority to German Application No. 10 2020 114 844.5, filed on Jun. 4, 2020, the contents of which are hereby incorporated by reference in their entirety.

TECHNICAL FIELD

Various embodiments relate generally to controller chips and methods of operating microcontroller chips.

BACKGROUND

Previous approaches for addressing failures in controller chips with respect to the power supply has been to have completely redundant controllers or system-on-chip that are on separate dies, each having its own power supply, clock and reset generation. That is, in existing architectures for controller, an isolated power management system block may serve as a safety corner that is able to retain its state during the unavailability of the other parts of the controller. However, in event of failure, the functions provided by existing controller chip, e.g., generation of power supply, reset, generating clock, voltage monitoring, are insufficient to make the functionality of the chip available during the event of fault in the main application cluster of the chip.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the described embodiments. In the following description, various embodiments are described with reference to the following drawings, in which.

DETAILED DESCRIPTION

Figure 1:
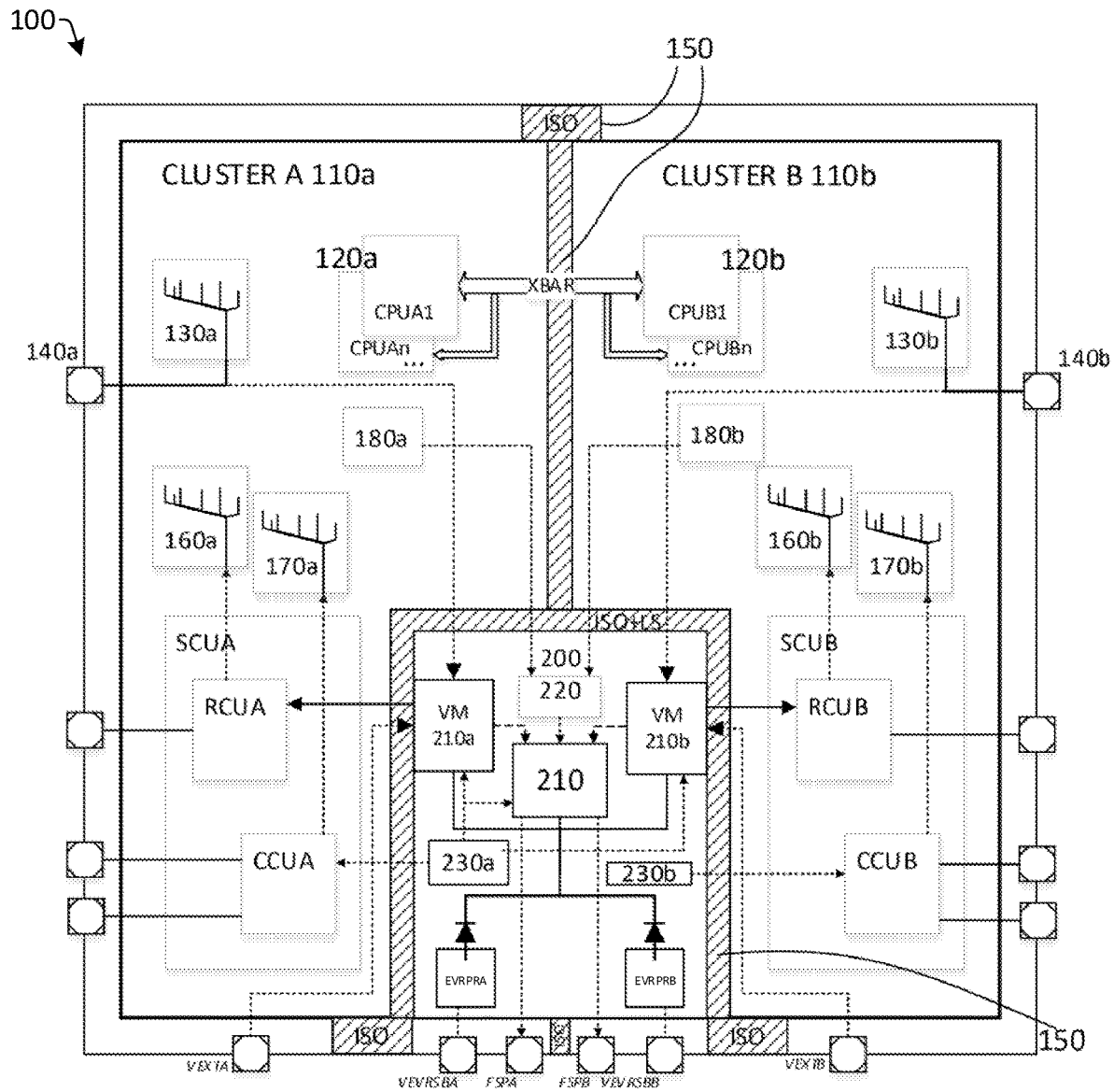
FIG. 1 shows an exemplary controller chip according to at least one exemplary embodiment of the present disclosure.

The following detailed description refers to the accompanying drawings that show, by way of illustration, specific details and embodiments which may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In the drawings, reference numbers may be appended with a letter (e.g., letter "a" for cluster A) to indicate to which cluster they belong.

FIG. 1 shows a controller chip 100 according to at least on exemplary embodiment of the present disclosure. The controller chip 100 may be a microcontroller, system-on-chip (SoC) device, or the like. The controller chip 100 may be configured to execute one or more programs and may have built in program and data memory.

Controller chips, such as the controller chip 100, may include a plurality of clusters. The exemplary controller chip 100 includes at least two functional clusters or core clusters, e.g., cluster A (e.g., first cluster 110a) and cluster B (e.g., second cluster 110b). These clusters may be realized or implemented monolithically. That is, the clusters may be formed on a single monolithic semiconductor substrate, e.g., single silicon substrate. Further, the quantity of clusters formed on a substrate for microcontrollers described herein may vary, that is, it is not limited to any particular number.

The first cluster 110a (e.g., cluster A) and the second cluster 110b (e.g., cluster B) each can include a plurality of components. As shown in FIG. 1, the clusters 110a and 110b respectively include one or more controller units 120a, 120b or processing cores (e.g., CPUs, processors), a clock tree or clock device 170a,170b, and a reset tree device 160a, 160b. The various cores or CPUS may be accompanied with one or more memory devices or components, e.g., a non-transitory memory. The controller units 120a, 120b may be configured to execute software, e.g., for an application or applications. That is, the controller units 120a, 120b may execute instructions accessible from the memory device. The memory device may include non-transitory memory for storing data. The controller chip 100 may include other storage, e.g., volatile or non-volatile storage devices.

While some connections are shown, other physical or logical connections between components of the controller chip 100 have been omitted for simplicity.

The clock tree 170a, 170b may produce or generate one or more clock signals for the controller units 120a, 120b or other components/devices of the same cluster. The reset tree 160a, 160b may be configured to reset or send reset commands or reset signals one or more components of the cluster it belongs to, such as processing cores.

Further, in accordance with exemplary embodiments, the clusters may each have their own separate and independent power source or power supply. For example, for the controller chip 100, the first cluster 110a includes a first power supply grid 130a and the second cluster 110b includes a second power supply grid 130b. The first power supply grid 130a may provide electrical power components of the first cluster 110a, e.g., the controller units 120a. Similarly, the second power supply grid 130b may provide electrical power to components of the second cluster 110b, e.g., the controller units 120b.

Further, the clusters 110a and 110b may include separate power supply inputs 140a, 140b. As shown in FIG. 1, the first power supply input 140a and the second power supply input 140b may include a contact pad. In accordance with exemplary embodiments, power supply inputs 140a, 140b for each cluster 110a, 110b may be separated or electrically isolated from each other. For example, the contact pads of power supply input 140a and 140b shown in FIG. 1 are shown to be separate and may each be connected to a different and independent power source. In short, the power supply inputs 140a and 140b may not have the same potential.

The clusters 110a, 110b, may be functional clusters that include other functional or electronic components. Each cluster may include a die temperature sensing circuit 180 that is configured to determine or monitor the temperature of the portion of the substrate at all respective cluster. Further, each cluster may have a digital part including a functional block or System Control Unit (SCU) which can include functional blocks such as a Reset Control Unit (RCU) and Clock Control Unit (CCU). Additionally, each cluster may include other components not shown, such as analog and/or digital devices.

While the first cluster 110a and the second cluster 110b are depicted as being identical or symmetrical this is not necessarily so. In other exemplary embodiments, such clusters may not be identical and include different types or amounts of components depending on the application.

The controller chip 100 shown in FIG. 1 also includes a third cluster 200. In the example of FIG. 1, the third cluster 200 is a monitoring cluster that can include a monitoring circuit 210. In accordance with exemplary embodiments, the monitoring circuit of the monitoring cluster may include or be realized as one or more controller units/processing cores/processors.

The monitoring circuit 210 can be configured to monitor for and detect failures of one or more other clusters of the same controller chip 100. The monitoring circuit 210 may monitor or and/or determine the status of the power supply input, clock signals, reset signals, or other relevant features of other clusters on the controller chip 100. For example, the monitoring circuit 210 may interface or interact (e.g., through sending and receiving signals) with other components of the other clusters being monitored (e.g., the first cluster 110a and/or the second cluster 110b). The monitoring circuit 210 may also interact with components of the monitoring cluster, which in turn interact with the other clusters. For example, the first cluster 110a and the cluster 110b may send signals indicating the status of various components. In some cases, the clusters may send alarm signals indicating a failure(s) with one or more components.

In some cases, monitoring clusters such as the third cluster 200 may include voltage monitors 210a and 210b. As shown in FIG. 1, the voltage monitors 210a and 210b may be coupled respectively to power supply inputs 140a and 140b so as to monitor the power supply of clusters 110a and 110b respectively. The voltage monitors 210a, 210b may be any suitable voltage monitors known in the art configured to monitor the power supply inputs and inform, by sending signals regarding the status of the power supply inputs 140a, 140b to the monitoring circuit 210. The monitoring circuit 210 may be configured to process the signals to determine whether there is a power failure with respect to a particular cluster.

As discussed previously, monitoring clusters such as the third cluster 200 may receive signals from the other clusters indicating the status of the power supply, the reset device or tree, clock tree, or other components. In one or more exemplary embodiments, the cores or controller units of individual clusters may detect or determine a failure has occurred. Such controller units, such as controller units 120a and 120 can be further configured to send one or more signals to the third cluster 200 informing about the detected failure, e.g., a detected failure with respect to power supply input, clock tree or clock signals, reset tree, etc.

In another example, clusters such as 110a and 110b may also include die temperature sensing circuits 180a and 180b respectively. These die temperature sensing circuits 180a, 180b may transmit signals that are received by monitoring circuit 210 and can be used to determine whether a particular cluster is experiencing a failure in some respect (e.g., clock signals, power, etc.). Similarly, the clock tree device 170a, 170b as well as the reset tree device 160a, 106b may be designed or configured to send signals regarding the status of the respective device. In some examples, such devices may send alarm signal to the third cluster 200 (e.g., monitoring circuit 210) when a failure is detected so as to indicate the existence of a problem or failure.

In exemplary embodiments of the present disclosure, monitoring clusters (e.g., the third cluster 200) may be configured to resolve or mitigate the effects of failures of one or more other clusters. For example, the monitoring circuit 210 of the third cluster 200 may be configured to, in the event or case of detecting, determining, or identifying at least one of a power supply failure or clock signal supply failure in one cluster (e.g. the first cluster 110a or the second cluster 110b), to indicate the failure to at least one other cluster that can help (e.g., a non-failing cluster). The monitoring circuit 210, for example, may send, one or more signals to at least one other cluster indicating actions for the non-failing cluster to take.

In response, the at least one other cluster (e.g., non-failing cluster) may take or initiate one or more remedial actions to accommodate or address the deficiencies of the failing cluster. For example, if the controller units 120a or 120b of a failing cluster are no longer able to perform or execute certain functions or tasks, e.g., due to a power failure, clock failure, etc., then the controller units 120a or 120b of a non-failing cluster may take over, at least in part, some of the tasks or functions of the failing cluster. That is, the controller units 120a or 120b of one or more non-failing cluster units may execute or perform tasks or operations previously executed by the controller units of the failing cluster based on the indication received by the monitoring cluster.

In one example, in a case where there are two functional clusters, e.g., the first cluster 110a and the second cluster 110b of controller chip 100, during normal operation, each cluster may provide 50% of application function or computational effort for an application. In the case of a failure by one cluster, the non-failing cluster may provide up to the other 50% previously provided by the now failing cluster. The non-failing cluster may provide the additional share of function until the failing cluster is rehabilitated, e.g., repaired and/or reset.

In other exemplary cases where there are two functional clusters, one functional cluster may perform 100% of the functions for an application while the other may remain silent (e.g., be in standby mode) and provide 0% share of the application function workload in a normal case (e.g., no failures or faults in primary cluster). That is, the primary cluster (e.g., first cluster 110a) may provide 100% application performance including access to resources of the secondary cluster (for instance, the first cluster 110a may use necessary peripheral and memory components of the second cluster 110b). The secondary cluster (e.g., second cluster 110b providing 0% share of functional support or performance for an application) may run in an idle mode. The secondary cluster may be configured to track the status of the primary cluster. The secondary cluster may be ready to take over peripherals upon a detected failure in the primary cluster. As such, a multi-cluster controller performing an application may use a secondary cluster for the immediate fallback upon the issue detection. That is, the controller or system may transition a secondary cluster from 0% to 100% share of operation of an application after the primary cluster or subsystem thereof experience a fault state. The use of symmetric architecture (e.g., identical functional clusters) may allow the operation or carrying out of an application to remain on the secondary cluster after the primary one has recovered.

In other examples, controllers described herein may have more than two (2) functional clusters. In contrast to the previously or other described cases, instead of a controller having one secondary cluster, there may be a plurality of secondary clusters. In such cases, a primary cluster may be responsible for 100% of an application, and in the event of a fault state by the primary cluster, one of the secondary clusters take over 100% (or less depending on the circumstances) of execution or functional performance of the application.

In other examples, the one or more secondary clusters may split or share responsibility (e.g., equally or in another appropriate division) for the performing the functions or tasks previously performed by the primary cluster experiencing failure or a fault state.

In other cases, there may not be a single primary cluster, but a plurality of primary clusters sharing responsibility or functions for an application. Further, one or more secondary clusters may assume reasonability for any of the primary clusters that experience a fault state or failure.

In exemplary embodiments, a monitoring cluster may be responsible for reassigning the work load or execution of functions from a failing cluster to one or more other clusters. In some exemplary embodiments, the monitoring cluster may be the same as any other functional cluster described herein. That is, the monitoring cluster may be a secondary cluster, which it itself can take over functions from a failing cluster.

Referring again to FIG. 1, in some cases, the previously failing clusters such as clusters 110*a* or 110*b* may be rehabilitated, e.g., after a reset of the cluster or components thereof, and then once again be able to perform or execute actions. The third cluster 200 (e.g., monitoring circuit 210) may identify that the cluster 110*a* or 110*b* has at partially "healed" and may inform the other cluster to stop performing actions on behalf the previous deficient or failing cluster. In other cases, the healed cluster 110*a* or 110*b* may inform, e.g., send signals by the controller units 120*a* or 120*b* to the other cluster or monitoring cluster of its updated status, e.g., that it will resume performing its tasks.

Similarly, to other clusters of the same microcontroller, the monitoring cluster may also be powered by a power supply input that is separate and/or independent from the power supply inputs of other clusters.

In some cases, monitoring clusters such as the third cluster 200 may include clock devices, such as clock devices 230*a* and 230*b*. The clock devices may provide signals for the monitoring cluster and may also be configured to provide clock signals to clusters that are experiencing deficiencies or failures in generating clock signals due from their clock devices or clock tree structures. In other words, the one or more clock devices 230*a*, 230*b* may act as a fall back clock device and provide clock signals for a cluster that is unable to reliably provide or generate clock signals. In other embodiments, the third cluster 200 may also be able to direct power to act as power supply to a cluster that has power supply input problems.

In various exemplary embodiments of the present disclosure, microcontrollers, such as the controller chip 100, may include one or more isolation or partition structures 150. For example, the clusters 110*a*, 110*b*, 200 may be partitioned from each other by one or more isolation structures 150. The one or more isolation structure or structures 150 may not only provide physical separation of the clusters of a microcontroller but they may also provide some electrical or electronic separation. For example, the isolation structures 150 may include a communicable medium to allow interfacing or communicating between different clusters if it is required based on configuration. That is, the various clusters of a microcontroller, e.g., sharing a common substrate, may or may not be directly electronically or electrically connected or coupled, and are configured to communicate with each other through the isolation structures based on configuration. In various embodiments, a physical implementation of isolation and level shifters may be used to ensure a high performance bandwidth is available where required, such as, for example, with bus interfaces for high speed vs. safety interface for low or lower speeds.

Figure 2:
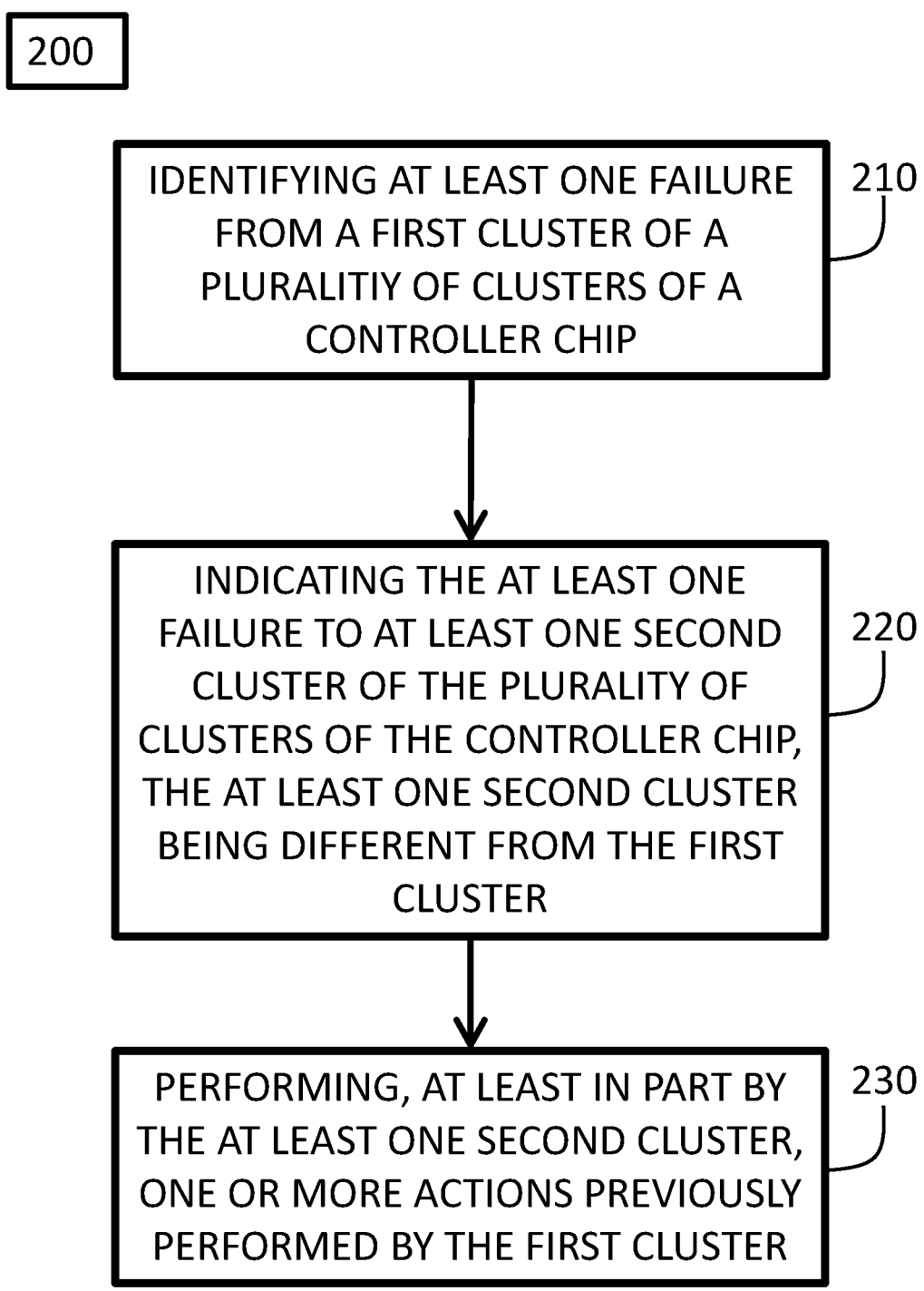
FIG. 2 shows an exemplary method according to at least one exemplary embodiment of the present disclosure.

FIG. 2 shows a method of operating a microcontroller according at least one exemplary embodiment of the present disclosure. The method may be operated by a microcontroller such as the controller chip 100 of FIG. 1. The method may include, a microcontroller including a plurality of clusters.

The method shown in FIG. 2 includes at 210, identifying at least one failure from a first cluster of a plurality of clusters of a controller chip. The method further includes at 220, indicating the at least one failure to at least one second cluster of the plurality of clusters of the controller chip, the at least one second cluster being different from the first cluster. The method then includes at 230, performing at least in part by the at least one second cluster, one or more actions previously performed by the first cluster.

Identifying or determining a failure can include determining or detecting a power supply input failure and/or a clock signal failure of a first cluster of the plurality of clusters of the microcontroller.

The method next includes indicating the failure of the first cluster to a second (other) cluster of the plurality of clusters. The determining or identifying of failure may be performed by a third cluster or a monitoring cluster. In accordance with exemplary embodiments, the plurality of clusters, including the first, second, and third clusters, may all be realized or formed on or from a single monolithic substrate.

The third cluster may identify failures of the first cluster and may indicate the failures to a second other cluster by sending one or more signals regarding the failure to the second cluster.

The method further includes the second cluster (e.g., at least one second cluster) performing or executing, for example, end-user MCU applications or parts of applications previously performed by the first cluster. For example, the second cluster may perform actions, tasks, or functions in response to the indication(s) received from the third cluster (e.g., the monitoring cluster). The indications (e.g., signals) may indicate what tasks or functions for the second cluster to take on, or partially take on due to the deficiencies or failures of the first cluster. For example, as previously described, such indication can inform that equal share of the application function between the first cluster and the second cluster is performed in a normal operation case. In case of a failure, one cluster can become silent (non-operational for a period) and a signal can be sent to indicate that another cluster provide 50% of the normal application performance of other first cluster. In other cases, signals can indicate that a first cluster provide full application function in a normal operation case while the second cluster is in idle state. The second cluster, in response to a signal, can be indicated to take over the full application function in case failure is detected in first cluster.

Example 1 is a controller chip, including: a first cluster including one or more first controller units, a first power supply grid to power the one or more first controller units, a first clock tree structure to supply one or more clock signals to the one or more first controller units, and at least a first power supply input to provide power to the first cluster; a second cluster including one or more second controller units, a second power supply grid to power the one or more second controller units, a second clock tree structure to supply one or more clock signals to the one or more second controller units, and at least a second power supply input to provide power to the second cluster; a monitoring cluster including a monitoring circuit configured to: monitor the power supply and the clock signal supply of each of the first cluster and second cluster, and in the event of determining at least one of a power supply failure or a clock signal supply failure in one cluster of the first cluster or the second cluster, indicate the failure to the other cluster to take one or more actions.

Example 2 is the controller chip of Example 1, wherein the first cluster and second cluster may be each configured, in response to receiving an indication from the monitoring circuit of a power supply failure or a clock signal supply failure in the other cluster, perform one or more actions previously undertaken by the other cluster according to the indication.

Example 3 is the controller chip of Example 1 or 2, wherein the monitoring circuit may be further configured to, in the event of event of determining at least one of a power supply failure or a clock signal supply failure in one cluster of the first cluster or the second cluster, initiate at least a partial restart of the one cluster.

Example 4 is the controller chip of any of Examples 1 to 3, wherein the first cluster, the second cluster, and the monitoring circuit may be formed on a single or common monolithic semiconductor substrate.

Example 5 is the controller chip of any of Examples 1 to 4, wherein the at least first power supply input to provide power to the first cluster may be independent from the at least second power supply input to provide power to the second cluster.

Example 6 is the controller chip of Example 5, and may further include a third power supply input to power the monitoring circuit, the third power supply input being independent from the at least first power supply input and the at least second power supply input.

Example 7 is the controller chip of any of Examples 1 to 6, wherein the monitoring cluster may include a power management circuit coupled to the first cluster and to the second cluster, and wherein in the event the monitoring circuit determines a power supply failure in one cluster, the power management circuit is configured to cause power from a secondary source to be provided to the cluster with the failing power supply.

Example 8 is the controller chip of Example 7, wherein the first cluster, the second cluster, and the monitoring cluster may be partitioned from each other by an isolation structure.

Example 9 is the controller chip of any of Examples 1 to 8, wherein the each of the first cluster, the second cluster may monitor a power supply, clock, or reset failure of a cluster different from itself.

Example 10 is the controller chip of any of Examples 1 to 9, wherein the first cluster may include a first reset tree to reset one or more components of the first cluster and the second cluster may include a second reset tree to reset one or more components of the second.

Example 11 is the controller chip of claim 10, wherein the first reset tree and the second reset tree may operate independently of each other.

Example 12 is the controller chip of any of claims 1 to 11, wherein the monitoring cluster may include a third clock tree structure, wherein the first, second, and third clock tree structures may operate independently of each other.

Example 13 is the controller chip of any of Examples 1 to 12, wherein the monitoring cluster may include a third power supply input to provide power to the monitoring cluster, and wherein the third power supply input is independent of the first and second power supply inputs.

Example 14 is the controller chip of any of Examples to 1 to 13, wherein the monitoring circuit may include a first voltage monitor coupled to the first power supply input of the first cluster and a second voltage monitor coupled to the second power input of the second cluster.

Example 15 is a method including: identifying at least one failure from a first cluster of a plurality of clusters of a controller chip; indicating the at least one failure to at least one second cluster of the plurality of clusters of the controller chip, the at least one second cluster being different from the first cluster; and performing at least in part by the at least one second cluster, the one or more actions previously performed by the first cluster.

Example 16 is the method of Example 15, wherein identifying the at least one failure from the first cluster and indicating the at least one failure to the at least one second cluster may be performed by a third cluster, different from the first cluster.

Example 17 is the method of Example 16, wherein the first cluster, the at least one second cluster, and the third cluster may be formed on a single or a common semiconductor substrate.

Example 18 is the method of Example 15, wherein indicating the at least one failure to the least one second cluster may include indicating the one or more actions previously performed by the first cluster to the least one second.

Example 19 is the method of Example 15, wherein identifying the at least one failure from the first cluster may include receiving one or more signals from the first cluster indicating the at least one failure.

Example 20 is a controller chip, including: a plurality of clusters each including one or more controller units, a power supply grid to power the one or more controller units, a clock tree structure to supply one or more clock signals to the one or more controller units, and at least a power supply input to provide power to the respective cluster; at least one monitoring circuit configured to monitor the power supply and the clock signal supply of at least one of the plurality of clusters, and in the event of determining at least one of a power supply failure or a clock signal supply failure in one cluster of the plurality of clusters, indicate the failure to at least one other non-failing cluster of the plurality of clusters.

Example 21 is the controller chip of Example 20, wherein the at least one monitoring circuit configured to indicate the failure includes being configured to transmit a signal to at least one other non-failing cluster of the plurality of clusters.

Example 22 is the controller chip of Example 20 or 21, wherein the at least one monitoring circuit is incorporated in at least one of the plurality of clusters.

While reference is made to to specific embodiments, it should be understood by those skilled in the art that various changes in form and detail may be made therein without departing from the spirit and scope as defined by the appended claims. The scope is thus indicated by the appended claims and all changes which come within the meaning and range of equivalency of the claims are therefore intended to be embraced.

What is claimed is:

1. A controller chip, comprising:
   a first cluster comprising one or more first controller units configured to provide a first computational effort for an application, a first power supply grid configured to power the one or more first controller units, a first clock tree structure configured to supply one or more clock signals to the one or more first controller units, a first reset tree configured to reset one or more components of the first cluster, and a first power supply input configured to provide power to the first cluster;
   a second cluster comprising one or more second controller units configured to provide a second computational effort for the application, a second power supply grid configured to power the one or more second controller units, a second clock tree structure configured to supply one or more clock signals to the one or more second controller units, a second reset tree configured to reset one or more components of the second cluster, and a second power supply input configured to provide power to the second cluster; and
   a monitoring cluster different from the first cluster and the second cluster, and comprising a third clock tree structure and a monitoring circuit, wherein the first, second, and third clock tree structures are configured to operate independently of each other, and the monitoring circuit is configured to:
      monitor the first power supply input and the first clock tree structure of the first cluster, and the second power supply input and the second clock tree structure of the second cluster; and
      in response to determining a power supply failure and/or a clock signal supply failure in the first cluster, indicate the determined power supply failure and/or the determined clock signal supply failure to the second cluster to take one or more actions;
   wherein the second cluster is configured, in response to receiving an indication from the monitoring circuit of the power supply failure or the clock signal supply failure in the first cluster, to re-assign the first computational effort from the first cluster to the second cluster according to the indication.

2. The controller chip of claim 1, wherein the monitoring circuit is further configured to, in response to determining the power supply failure and/or the clock signal supply failure in the first cluster, initiate at least a partial restart of the first cluster.

3. The controller chip of claim 1, wherein the first cluster, the second cluster, and the monitoring cluster are formed on a single monolithic semiconductor substrate.

4. The controller chip of claim 1, wherein the first power supply input configured to provide power to the first cluster is independent from the second power supply input configured to provide power to the second cluster.

5. The controller chip of claim 4, further comprising:
   a third power supply input configured to power the monitoring circuit, the third power supply input being independent from the first power supply input and the second power supply input.

6. The controller chip of claim 1, wherein the monitoring cluster comprises a power management circuit coupled to the first cluster and to the second cluster, wherein in response to the monitoring circuit determining the power supply failure in the first cluster, the power management circuit is configured to cause power from a secondary source to be provided to the first cluster having the power supply failure.

7. The controller chip of claim 1, wherein each of the first cluster and the second cluster is configured to monitor for the power supply failure, the clock signal supply failure, or a reset failure of a cluster different from itself.

8. The controller chip of claim 1, wherein the first reset tree and the second reset tree are configured to operate independently of each other.

9. The controller chip of claim 1, wherein the monitoring cluster comprises a third power supply input configured to provide power to the monitoring cluster, wherein the third power supply input is independent of the first and second power supply inputs.

10. The controller chip of claim 1, wherein the monitoring circuit comprises a first voltage monitor coupled to the first power supply input of the first cluster and a second voltage monitor coupled to the second power supply input of the second cluster.

11. The controller chip of claim 1, wherein prior to re-assignment of the computational effort from the first cluster to the second cluster, the first cluster uses a first amount of computational effort and the second cluster use a second amount of computational effort, wherein the second amount of computational effort is less a maximum computational effort of the second cluster by a predetermined amount of computational effort, and wherein the first amount of computational effort is less than or equal to the predetermined amount such that after the re-assignment the second cluster has a resultant computational effort that is a sum of the first amount of computational effort and the second amount of computational effort.

12. A method to be performed by a controller chip, wherein the controller chip includes:
   a first cluster comprising one or more first controller units, a first power supply grid to power the one or more first controller units, a first clock tree structure to supply one or more clock signals to the one or more first controller units, a first reset tree configured to reset one or more components of the first cluster, and a first power supply input to provide power to the first cluster; and
   a second cluster comprising one or more second controller units, a second power supply grid to power the one or more second controller units, a second clock tree structure to supply one or more clock signals to the one or more second controller units, a second reset tree configured to reset one or more components of the second cluster, and a second power supply input to provide power to the second cluster,
   the method comprising:
      monitoring, by a monitoring circuit of a monitoring cluster that includes a third clock tree, the first and second power supply inputs and the first and second clock tree structures, the monitoring cluster being different from the first cluster and the second cluster and the first, second, and third clock tree structures configured to operate independently of each other;
      identifying, by the monitoring circuit, at least one failure in the first power supply input and/or the first clock tree structure while the first cluster is performing one or more computational actions;
      indicating, by the monitoring circuit, the at least one failure to the second cluster; and
      performing, at least in part by the second cluster, the one or more computational actions previously performed by the first cluster.

13. The method of claim 12, wherein the first cluster, the second cluster, and the monitoring cluster are formed on a single semiconductor substrate.

14. The method of claim 12, wherein indicating the at least one failure to the second cluster comprises indicating the one or more computational actions previously performed by the first cluster to the second cluster.

15. The method of claim 12, wherein identifying the at least one failure from the first cluster comprises receiving one or more signals from the first cluster indicating the at least one failure.

16. A controller chip, comprising:
a plurality of clusters each including one or more controller units, a power supply grid configured to power the one or more controller units, a clock tree structure configured to supply one or more clock signals to the one or more controller units, a reset tree configured to reset one or more controller units of a first cluster, and a power supply input configured to provide power to a respective cluster of the plurality of clusters, wherein the clock tree structures of the plurality of clusters are configured to operate independently of each other; and at least one monitoring circuit configured to monitor a power supply input and a clock tree structure of at least one cluster of the plurality of clusters, and in response to determining a clock tree structure failure in the at least one cluster of the plurality of clusters, indicate the clock tree structure failure to at least one other non-failing cluster of the plurality of cluster.

17. The controller chip of claim 16, wherein the at least one monitoring circuit is configured to indicate the clock tree structure failure by transmitting a signal to the at least one other non-failing cluster of the plurality of clusters.

18. The controller chip of claim 16, wherein the at least one other non-failing cluster is configured, in response to receiving the indication from the monitoring circuit of the clock tree structure failure, to re-assign a computational effort from the at least one cluster to the at least one other non-failing cluster according to the indication, and subsequently re-assigning the computational effort back to the at least one cluster when the at least one cluster is repaired or reset.

* * * * *